(12) United States Patent
　　　 Michalski

(10) Patent No.:　US 12,571,667 B2
(45) Date of Patent:　　Mar. 10, 2026

(54) FILL-LEVEL MEASUREMENT DEVICE

(71) Applicant: Endress+Hauser SE+Co. KG, Maulburg (DE)

(72) Inventor: Bernhard Michalski, Maulburg (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 554 days.

(21) Appl. No.: 17/999,520

(22) PCT Filed: Apr. 23, 2021

(86) PCT No.: PCT/EP2021/060726
　　　§ 371 (c)(1),
　　　(2) Date: Nov. 21, 2022

(87) PCT Pub. No.: WO2021/239348
　　　PCT Pub. Date: Dec. 2, 2021

(65) Prior Publication Data
　　　US 2023/0280200 A1　　Sep. 7, 2023

(30) Foreign Application Priority Data
　　May 26, 2020　　(DE) ..................... 10 2020 114 108.4

(51) Int. Cl.
　　　*G01F 23/284*　　　(2006.01)
　　　*G01F 25/20*　　　(2022.01)
(52) U.S. Cl.
　　　CPC ............ *G01F 23/284* (2013.01); *G01F 25/20* (2022.01)

(58) Field of Classification Search
　　　CPC .. G01S 13/87; G01F 23/2962; G01F 25/0084; G01F 23/284; G01F 23/266;
　　　　　(Continued)

(56) References Cited

U.S. PATENT DOCUMENTS 4,135,397 A * 1/1979 Krake ................... G01F 23/284
　　　　　　　　　　　　　　　　　　　　73/304 R
6,414,625 B1 7/2002 Kleman
　　　　　　　　　(Continued)

FOREIGN PATENT DOCUMENTS

CN　　　108139260 A　　6/2018
DE　　　10037715 A1 * 2/2002 ........... G01F 23/284
　　　　　　　(Continued)

*Primary Examiner* — Catherine T. Rastovski
*Assistant Examiner* — Sharad Timilsina
(74) *Attorney, Agent, or Firm* — Mark A. Logan; Endress+Hauser (USA) Holding, Inc.

(57)　　　　　ABSTRACT

A radar-based, fill-level measurement device for measuring a fill-level of a filling material in a container, the high-frequency unit of which can be checked with regard to its functionality, is designed redundantly and thus comprises two, activatable, high-frequency sources for generating the high-frequency signal and two, activatable receivers for sampling the received signal such that a time-prolonged evaluation signal is generated. As a result, a correspondingly designed diagnosis unit can switch between the active high-frequency source and/or between the active receiver, wherein before and after the switching, a defined property of the evaluation signal, such as a signal amplitude, is ascertained. If the defined property of the evaluation signal changes at least by a defined value as a result of the switching, the high-frequency unit is classified as not functional.

6 Claims, 3 Drawing Sheets

(58) Field of Classification Search

CPC ........ G01F 23/22; G01F 22/00; G01F 23/804; G01F 23/292; G01F 23/00; G01F 23/2968; G01F 15/003; G01F 15/005; G01F 23/0007; G01F 23/244; G01F 25/20

See application file for complete search history.

(56) References Cited

U.S. PATENT DOCUMENTS

| | | | | | |
|---|---|---|---|---|---|
| 6,930,632 | B2 * | 8/2005 | Lalla | ..................... | G01S 13/103 |
| | | | | | 73/304 R |
| 7,532,155 | B2 * | 5/2009 | Kleman | ................. | H01Q 1/225 |
| | | | | | 342/124 |
| 2008/0309547 | A1 * | 12/2008 | Michalski | ............. | G01F 23/284 |
| | | | | | 342/137 |
| 2010/0071459 | A1 * | 3/2010 | Kamm | ................... | G01D 3/036 |
| | | | | | 73/304 C |
| 2011/0199103 | A1 * | 8/2011 | Osswald | ............. | G01F 23/2962 |
| | | | | | 324/658 |
| 2012/0323503 | A1 * | 12/2012 | Welle | ................... | G01F 23/263 |
| | | | | | 73/304 C |
| 2013/0009803 | A1 | 1/2013 | Edvardsson | | |
| 2015/0226594 | A1 * | 8/2015 | Frovik | ................... | G01S 13/88 |
| | | | | | 342/124 |
| 2015/0377678 | A1 | 12/2015 | Edvardsson | | |

FOREIGN PATENT DOCUMENTS

| | | |
|---|---|---|
| DE | 102008048582 A1 | 3/2010 |
| DE | 102014114752 A1 | 4/2016 |
| DE | 102015120362 A1 | 6/2017 |
| DE | 102016213324 B3 | 8/2017 |
| DE | 102017123185 A1 | 4/2019 |
| WO | 2009142595 A1 | 11/2009 |

* cited by examiner

FILL-LEVEL MEASUREMENT DEVICE

CROSS-REFERENCE TO RELATED APPLICATIONS

The present application is related to and claims the priority benefit of DPMA Patent Application No. 10 2020 114 108.4, filed on May 26, 2020, and International Patent Application No. PCT/EP2021/060726, filed on Apr. 23, 2021, the entire contents of which are incorporated herein by reference.

TECHNICAL FIELD

The invention relates to a fill-level measurement device, the functionality of which can be checked.

BACKGROUND

In automation technology, especially for process automation, field devices are often used, which serve to detect various measured variables. The measured variable to be determined may, for example, be a fill-level, a flow, a pressure, the temperature, the pH, the redox potential, a conductivity, or the dielectric value of a medium in a process plant. In order to detect the corresponding measured values, the field devices each comprise suitable sensors or are based upon suitable measuring principles. A variety of different types of field devices are produced and marketed by the Endress+Hauser group of companies.

For measuring the fill-level of filling materials in containers, radar-based measuring methods have become established, since they are sound and low-maintenance. A key advantage of radar-based measuring methods lies in the ability to measure the fill-level more or less continuously. In the context of this patent application, the terms, "radar" and "high-frequency," refer to radar signals of frequencies between 0.03 GHz and 300 GHz. Typical frequency bands at which fill-level measurement is performed are at 2 GHz, 26 GHz, 79 GHz, or 120 GHz. The two common measurement principles here are the pulse transit time principle (also known by the term, "pulse radar") and the FMCW ("frequency-modulated continuous wave") principle.

In the case of the pulse transit time method, high-frequency signals are emitted in a pulsed manner at a defined clock speed in the direction of the filling material by means of a high-frequency source. Based upon this, the transit time up until the arrival of the high-frequency pulses reflected at the filling material surface is measured by receiving a corresponding received signal. In order for the transit time or the distance from the filling material to be determined more easily, in terms of circuitry, on the basis of the high-frequency received signal, a time-prolonged evaluation signal is again generated on the basis of the received signals. In this case, on account of the high pulse frequency, the evaluation signal is generated by subsampling of the received signal. The subsampling takes place in a receiver by sampling the received high-frequency pulses using corresponding generated scanning pulses, wherein the sampling rate thereof deviates from the clock speed of the transmitted high-frequency pulses in the permille range. To ensure that the corresponding target deviation between the sampling rate and the clock speed is adhered to, the sampling rate is readjusted by a control loop as a function of the measured actual deviation. Overall, the evaluation signal thus reproduces the signal amplitude of the received signal or of the reflected high-frequency pulses in a time-prolonged manner.

In this case, the evaluation signal mirrors the signal amplitude of the received signal as a function of the measurement device distance from the filling material.

In contrast to the pulse transit time method, FMCW is based upon the fact that the high-frequency source transmits the high-frequency signal continuously, but at a modulated frequency. In this case, the frequency of the high-frequency signal to be transmitted is within a fixed frequency band in the range of a standardized center frequency. The change in frequency over time is linear by default for FMCW, and has a sawtooth or triangular shape. However, a sinusoidal change can in principle also be used. In this case, the distance from the filling material or the fill-level is determined, upon implementation of the FMCW method, on the basis of the instantaneous frequency difference between the current received signal and the currently-emitted high-frequency signal, in that the receiver in turn generates the time-prolonged evaluation signal by mixing the corresponding electrical HF signals. In this case, the distance can be ascertained on the basis of the frequency of the evaluation signal, since the frequency of the evaluation signal inherently changes proportionally to the distance.

On the basis of the pulse transit time method and on the basis of the FMCW method, fill-level measurement devices can be implemented with comparatively low circuit complexity and a high fill-level resolution in the sub-millimeter range. Radar-based measurement principles are described in greater detail in, for example, "*Radar Level Detection*, Peter Devine, 2000."

In addition to freely-radiating radar measurement, in which the high-frequency signals are emitted or received via an antenna, the variant of guided radar also exists. In this case, instead of the antenna as a transmission unit, an electrically-conductive measuring probe (for example, a coaxial cable or a metal rod) is used, which is lowered into the container in order to guide the high-frequency signals. Similarly to freely-radiating radar, the high-frequency signal in the measuring probe is reflected at the level of the filling material surface and guided back along the measuring probe towards the fill-level measurement device. This variant of radar-based, fill-level measurement is also known by the term, "TDR" (time-domain reflectometry). This variant is advantageous in that, due to the guided signal radiation, less power is required for operating the fill-level measurement device. Analogously to freely-radiating radar devices according to the pulse transit time or FMCW principle, an evaluation signal for ascertaining the fill-level is also generated when implementing the TDR principle.

Regardless of the implemented measurement principle, for safety-relevant fill-level measurement devices, it is required that the different functional units of the device be able to be monitored in such a way that a possible malfunction of each unit can be detected with sufficient safety. Corresponding safety specifications are defined, for example, as "Safety Integrity Level x (SILx)" according to the IEC61508 standard series. If the fill-level measurement device cannot or can only partially comply with such safety specifications, it is considered unsafe and may be operated only with appropriately shorter test cycles, if at all. However, such test cycles are complex and, accordingly, undesirable in an ongoing production process. With regard to the high-frequency unit, which comprises the high-frequency source and the receiver, the ability to check the correct function is difficult, however, because failures in the analog range often cannot be clearly recognized as a fault. This relates, for example, to creeping changes, which affect the measurement accuracy and are thus safety-relevant.

SUMMARY

The invention is therefore based upon the object of providing a fill-level measurement device which can check the functionality of its high-frequency unit.

The invention achieves this object by a fill-level measurement device for measuring a fill-level of a filling material in a container which operates according to a radar-based measurement principle, and comprises at least the following units:

a transmission unit, by means of which high-frequency signals can be transmitted towards the filling material and can be received as received signals after reflection at the filling material surface, a high-frequency unit, having
two, actively-switchable, high-frequency sources, each configured to generate the high-frequency signal,
two, actively-switchable receivers, by means of which the received signal can in each case be time-prolonged, a control unit, which is designed to
in each case actively switch one of the high-frequency sources, such that the active high-frequency source generates the high-frequency signal, and
in each case actively switch one of the receivers, such that the active receiver converts the received signal into a time-prolonged evaluation signal, an evaluation unit, which is designed to
ascertain a predefined property and a signal transit time of at least one signal maximum, on the basis of the evaluation signal, and
determine the fill-level on the basis of the signal transit time of the signal maximum, and a diagnosis unit, which is designed
to control the control unit such that the high-frequency source, active in each case, and/or the receiver, active in each case, is/are switched to be inactive, and vice versa,
to control the evaluation unit such that the defined property of the evaluation curve is ascertained in each case before and after the switching, and
to classify the high-frequency unit as non-functional if the defined property of the evaluation signal changes at least by a defined value as a result of the switching.

The invention is therefore based upon designing all essential components of the high-frequency unit redundantly, wherein the functionality of the high-frequency unit is checked by switching (i.e., switching off the component active up to that point and activating the corresponding component not active up to that point) of at least one of the redundant components. In this case, the check is carried out in that the evaluation signal is examined for changes in the evaluation signal resulting from the switching. Accordingly, the diagnosis unit of the fill-level measurement device can generate a corresponding error signal, depending, for example, upon the field of application, if the diagnosis unit classifies the high-frequency unit as non-functional. Alternatively or in addition, it is also conceivable for the diagnosis unit to generate a corresponding "OK signal," as long as the high-frequency unit is classified as functional.

In the context of the invention, the term, "unit," in principle refers to any electronic circuit that is designed in a manner suitable for the intended purpose. Depending upon the requirement, it can therefore be an analog circuit for generating or processing corresponding analog signals. However, it may also be a digital circuit, such as an FPGA, or a storage medium in interaction with a program. In this case, the program is designed to perform the corresponding method steps or to apply the necessary calculation operations of the respective unit. In this context, various electronic units of the measurement device in the sense of the invention can potentially also access a common physical memory or be operated physically by means of the same digital circuit.

In the context of the invention, in principle, several properties are possible as the defined property for which the evaluation signal is checked during the switching; in this regard, the diagnosis unit can be designed, for example, to compare an edge steepness, a signal amplitude, and/or a corresponding signal transit time of one of the signal maxima as the defined property of the evaluation signal.

If the fill-level measurement device is based upon the TDR principle, and the transmission unit is accordingly designed as an electrically-conductive measuring probe which, in the installed state of the fill-level measurement device, extends approximately perpendicularly to the container base, it is furthermore, advantageously, possible for one of the two high-frequency sources to be designed in an inverting manner, and/or for one of the two receivers to be designed in an inverting manner. As a result, the polarity of the evaluation signal changes when the high-frequency unit is functional, if the component that is active in each case is switched. This reduces the radiation emissions of the fill-level measurement device, as is described, for example, in the publication WO2005/062002 A1. In this case, the evaluation unit is preferably to be designed in such a way that it inverts the polarity of the evaluation signal again, if the polarity changes as a result of switching, and that it ascertains the defined property on the basis of the evaluation signal, which is possibly inverted back in terms of polarity.

Furthermore, the inverting design of one of the receivers or of one of the high-frequency sources can be used for checking the functionality of the high-frequency unit; for this purpose, the evaluation unit must be designed to ascertain the polarity of the evaluation signal. In addition, the diagnosis unit must be designed to control the evaluation unit in such a way that, in each case before and after the switching of the active high-frequency source or of the active receiver, its polarity is ascertained as the defined property of the evaluation signal. As a result, the diagnosis unit can classify the high-frequency unit as non-functional if the polarity of the evaluation signal does not change as a result of the switching.

In principle it is not relevant, in the sense of the invention, whether the fill-level measurement device is based upon the FMCW or the pulse transit time principle. In the case of the pulse transit time principle, the receivers can, for example, be designed as samplers. In order to implement the pulse transit time principle, the control unit is also to be accordingly designed in order to actuate the high-frequency source, active in each case, in such a way that the high-frequency signal is generated in a pulse-shaped manner, according to the pulse transit time method. In addition, in the case of the pulse transit time method, the evaluation unit controls the sampler, active in each case, such that the received signal is subsampled according to the pulse transit time method, so that the evaluation signal is time-discretized.

The high-frequency source can be designed, both in the case of FMCW and in the case of the pulse transit time method, as a high-frequency oscillator, wherein it is possible for its frequency to be controlled, at least in the case of FMCW, by, for example, a "Phase Locked Loop (PLL)". In the case of TDR, it is sufficient to design the high-frequency source as a capacitor. In the case of the FMCW method, the receivers can be designed, for example, as mixers, in order to mix the incoming received signal with the high-frequency signal to be emitted, and thereby to obtain the time-prolonged evaluation signal, in a manner corresponding to the pulse transit time method.

Analogously to the fill-level measurement device according to the invention, the object of the invention is also achieved by a corresponding measurement method for checking the functionality of the fill-level measurement device. In this case, the method comprises the following method steps:

generating the high-frequency signal by means of the high-frequency source that is switched to be active in each case, sending the high-frequency signal towards the filling material and receiving the corresponding received signal after reflection at the filling material surface, receiving the received signal by means of the receiver, switched to be active in each case, such that a time-prolonged evaluation signal is generated, ascertaining the defined property of the evaluation signal, switching the high-frequency source, active in each case, so as to be passive, and vice versa, and/or switching the receiver, active in each case, so as to be passive, and vice versa.

Subsequently, the prior method steps, apart from the switching of the active high-frequency source or of the active receiver, are repeated. The repetition of the method steps makes it possible to finally compare the defined property before and after the switching, and classify the high-frequency unit as non-functional if the defined property of the evaluation signal has changed by a defined minimum value as a result of the switching.

In this case, the method can be automated, for example, in that the switching of the high-frequency source, active in each case, or of the receiver, active in each case, the comparison of the defined property before and after the switching, and the classification of the high-frequency unit with regard to its functionality, are carried out cyclically in the measuring operation.

BRIEF DESCRIPTION OF THE DRAWINGS

The invention is explained in more detail with reference to the following figures, in which.

DETAILED DESCRIPTION

Figures 1, 2:
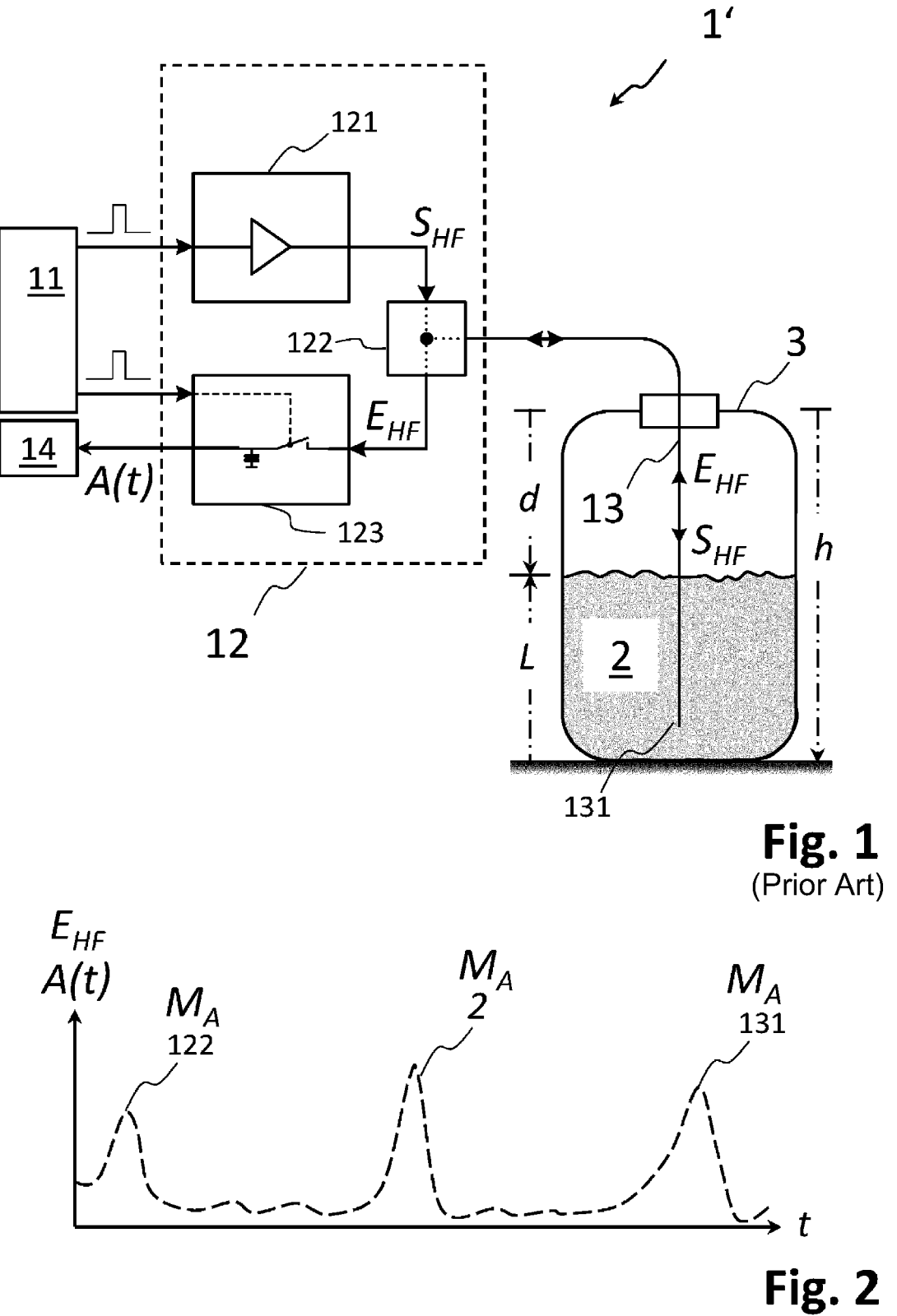
FIG. 1 shows a TDR-based, fill-level measurement device according to the prior art.
FIG. 2 shows a schematic representation of an evaluation signal.

For a basic understanding of the invention, FIG. 1 shows a block diagram of a fill-level measurement device 1' constructed according to the prior art, which serves to measure the fill-level L of a filling material 2 located in a container 3. The fill-level measurement device 1' shown is based upon the pulse transit time principle, wherein, in accordance with the TDR method, it comprises a measuring probe as the transmission unit 13. In order to determine the fill-level L, the measuring probe 13 accordingly extends in the container interior from the top side to just above the container base. In this case, the installation height h of the measuring probe 13 above the container base is known and stored in an evaluation unit 14 of the fill-level measurement device 1'.

According to the pulse transit time method, the measuring probe 13 accordingly conducts a high-frequency signal $S_{HF}$, in a pulsed manner, in the direction of the filling material 2. Due to the jump in the dielectric value there, the high-frequency signal $S_{HF}$ is reflected at the level of the filling material surface 2 in the measuring probe 13 and received accordingly as the received signal $E_{HF}$, after a corresponding signal transit time t, in the fill-level measurement device 1'. In this case, the signal transit time of the signal $S_{HF}$, $E_{HF}$ depends upon the distance d=h–L of the container top from the filling material surface.

In order to generate the high-frequency signal $S_{HF}$, the fill-level measurement device 1' comprises, as a component of a high-frequency unit 12, a first high-frequency source 121. In this case, the first high-frequency source 121 can be designed according to the TDR method as, for example, a capacitor, which is discharged accordingly to generate the pulse lasting 100 ps to approximately 1 ns. In the case of freely-radiating radar according to the pulse transit time or FMCW method, the first high-frequency source 121 can be designed, for example, as a frequency-controlled, high-frequency, oscillating circuit or as a crystal oscillator. In order for the first high-frequency source 121 to generate the high-frequency signal $S_{HF}$ in accordance with the TDR method at the required cycle rate, the first high-frequency source 121 is actuated in a correspondingly clocked manner by a control unit 11 outside the first high-frequency unit 12. In this case, the first high-frequency source 121 guides the high-frequency signal $S_{HF}$ to be transmitted to the measuring probe 13 via a transceiver switch 122. In this case, the design of the transceiver switch 122 is, in principle, not strictly specified. In the case of TDR, as is the case in the variant shown in FIG. 1, the transceiver switch 122 can be designed, for example, purely as an electrical node. Particularly in the case of freely-radiating radar, the transceiver switch 122 can be implemented as, for example, a duplexer.

The received signal $E_{HF}$ entering the high-frequency unit 12 from the measuring probe 13 is guided via the transceiver switch 122 to a first receiver 123. According to the pulse transit time principle, the received signal $E_{HF}$ is subsampled in the first receiver 123, such that an evaluation signal A(t) is generated, which reproduces the received signal $E_{HF}$ in a manner time-prolonged by a defined factor. In this case, the time prolongation factor depends upon the sampling rate. The corresponding sampling rate must be selected in order to achieve a sufficient time prolongation, such that it differs from the clock rate of the emitted signal pulses $S_{HF}$ only in the permille range. Accordingly, the sampling rate at which the first receiver 123 samples the received signal $E_{HF}$ is again set at the first receiver 123 by the control unit 11, which also specifies the clock rate of the emitted signal pulses $S_{HF}$. The time prolongation simplifies, from a circuitry perspective, the determination of the fill-level L on the basis of the received signal $E_{HF}$. In contrast to the variant shown in FIG. 2, in the case of freely-radiating radar, in addition to the time prolongation, the received signal $E_{HF}$ is rectified in the first receiver 123, such that the evaluation signal A(t) has only one polarity—plus or minus—in relation to a fixed reference potential.

In order to determine the fill-level L, the first receiver 123 transmits the evaluation signal A(t) to an evaluation unit 14. If the first receiver 123 is a digital sampler, this already takes place in a digitized manner. In this case, the determination of the fill-level L by means of the evaluation signal A(t) by the evaluation unit 14 is illustrated in more detail with reference to FIG. 2:

FIG. 2 illustrates the temporal amplitude progression of the received signal $E_{HF}$ or the time-prolonged evaluation signal A(t). In this case, the distance d between the container top and the filling material surface is proportional to the time axis of the evaluation signal A(t) and proportional to the time axis of the received signal $E_{HF}$. In the ideal case, i.e., without any external interference influences, the received signal $E_{HF}$ comprises three signal maxima $M_a$. The temporally first signal maximum $M_a$ is to be attributed to the internal reflection of the high-frequency signal $S_{HF}$ at the transceiver switch 122. The temporally second signal maximum $M_a$ in the received signal $E_{HF}$ is brought about at the surface of the filling material 2, while the third signal maximum $M_a$ is caused by the probe end 131 of the measuring probe 13.

Using any filter method, the evaluation unit 14 is capable of ascertaining the signal transit time $t_M$ of the signal maximum $M_a$, which is caused by the filling material surface. Based upon corresponding calibration data, the evaluation unit 14 calculates, from this signal transit time $t_M$, the corresponding distance d, and due to the relationship L=h−d or the known installation height h, the fill-level L can again be determined on the basis of the distance d.

Figure 4A:
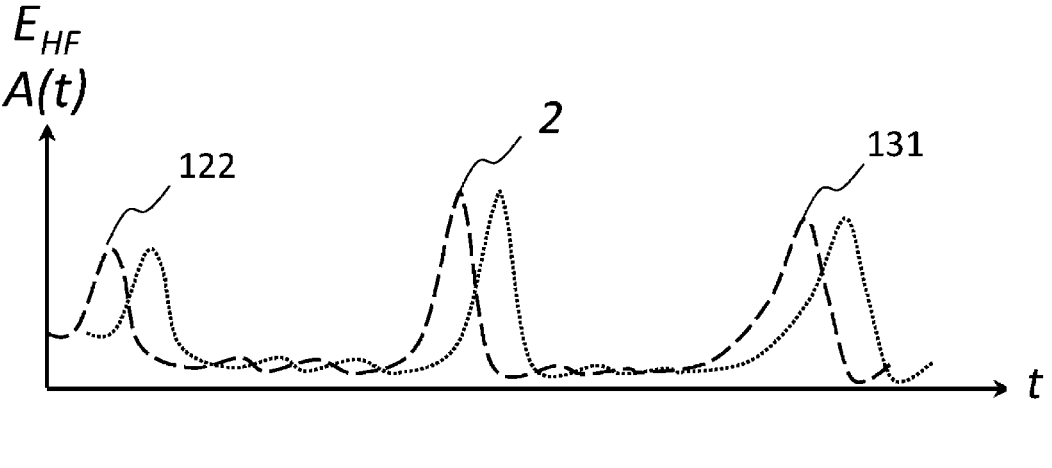
FIGS. 4a, 4b show possible effects of a faulty high-frequency unit on the evaluation curve.

A central prerequisite for the evaluation unit 14 to be able to correctly determine the fill-level L with certainty is the error-free functioning of the high-frequency unit 12, since, depending upon the impairment, this does not lead to an obvious failure of the high-frequency unit 12. As shown in FIG. 4a, a non-functional high-frequency unit 12 can, e.g., with increasing time in use, lead to a creeping offset of the received signal $E_{HF}$ or an offset of the evaluation signal A(t). As a result, the signal transit time $t_M$ of the fill-level maximum $M_A$ may not be noted, and thus the ascertained distance value d be distorted. The result of a gradual degradation of a high-frequency amplifier of the high-frequency unit 12 is again illustrated in FIG. 4b; by such a failure mechanism, the amplitude of the evaluation signal $S_{HF}$ or of the underlying received signal $E_{HF}$ can be damped, such that, as a result, the evaluation unit 14 does not, in case of doubt, identify the signal maximum $M_A$ upon which the filling material surface is based, but rather, erroneously, uses a different signal maximum $M_A$ to ascertain the distance d or the fill-level L. Such non-functionality of the high-frequency unit 12 is also not directly recognizable from the outside. However, a sudden failure of one of the units is also conceivable, and can be identified, depending upon the situation. Thus, the fill-level measurement device 1' cannot be used in applications where corresponding safety requirements such as "SIL" must be adhered to.

Figure 3:
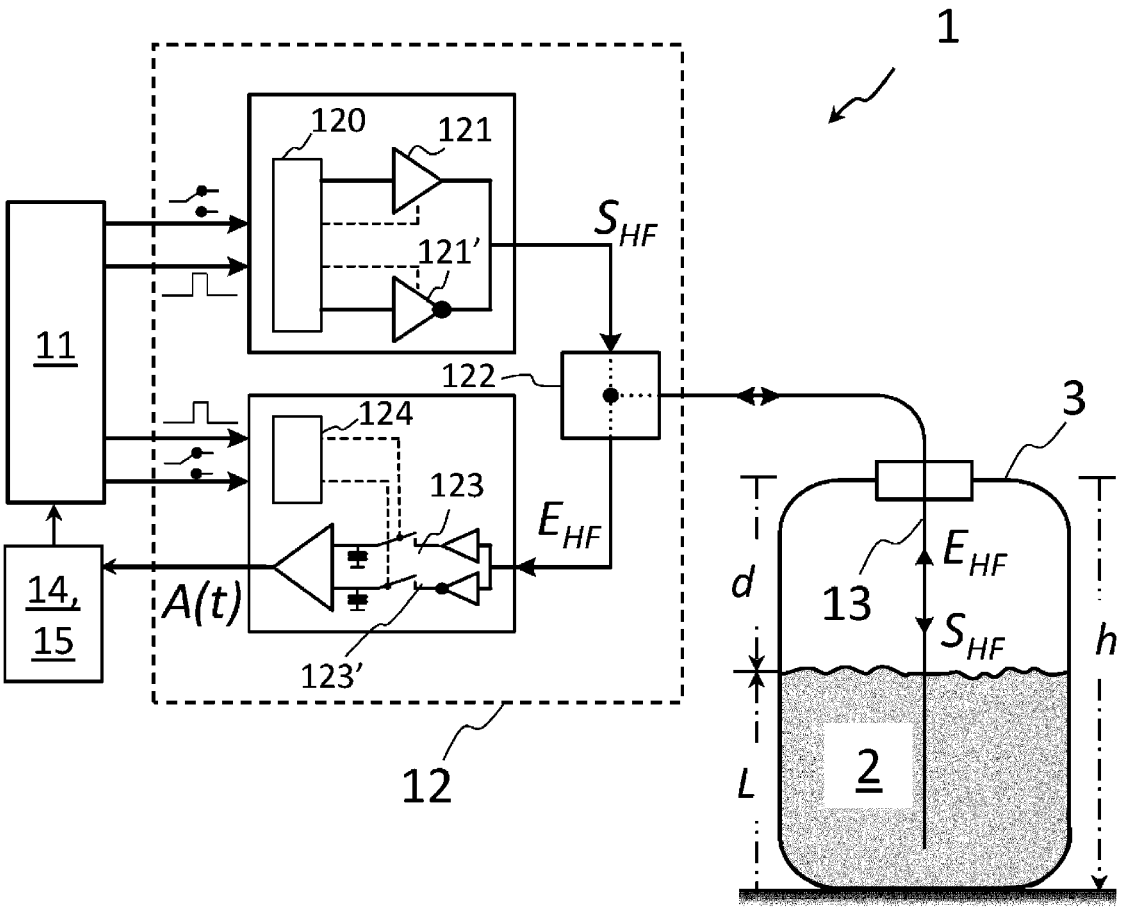
FIG. 3 shows a block diagram of a fill-level measurement device according to the present disclosure.

A possible embodiment of the fill-level measurement device 1 according to the invention, by means of which a possible non-functionality of the high-frequency unit 12 can be diagnosed, is therefore described in more detail in FIG. 3; in principle, the design and the mode of operation of the fill-level measurement device 1 shown in FIG. 3 correspond to the variant shown in FIG. 1. In addition, however, the high-frequency unit 12 of the fill-level measurement device 1 according to the invention comprises a second high-frequency source 121' and a second receiver 123'. In this case, it is advantageous if the second high-frequency source 121' is designed identically to the first high-frequency source 121—for example, again as a capacitor. The same applies for the second receiver 123' in relation to the first receiver 123.

In the case of freely-radiating radar, i.e., contrary to the variant shown in FIG. 3, it is advantageous, with respect to the high-frequency sources 121, 121', if they generate the high-frequency signal $S_{HF}$ at the same frequency, in order to ensure the same signal behavior. The control unit 11 can selectively activate one of the two high-frequency sources 121, 121' by means of a first switch 120. By means of a second switch 124, the control unit 11 can again selectively activate one of the two receivers 123, 123'. In this context, the switches 120, 124 can be designed, for example, as transistors, the gate/base of which is actuated by the control unit 11.

In relation to the high-frequency sources 121, 121', the term, "activate," relates to switching on the high-frequency source 121, 121' to be activated, as well as the connection of the high-frequency source 121, 121' to be activated, to the measuring probe 13 or to the transceiver switch 122. Regarding the term, "switching," this means that the high-frequency source 121, 121' to be switched to be inactive is disconnected from the measuring probe 13 and/or that it is switched off. With regard to the two receivers 123, 123', the term, "activate," refers to the sampling of the received signal $E_{HF}$ and transmitting the corresponding evaluation signal A(t) to the evaluation unit 14. This in turn means, in connection with the term, "switching," that the receiver 123, 123' to be switched to be inactive no longer samples the received signal $E_{HF}$ and/or no longer transmits the evaluation signal A(t) to the evaluation unit 14, following activation of the other receiver 123, 123'.

In the case of the variant of the fill-level measurement device 1 according to the invention shown in FIG. 3, too, the control unit 11 in principle provides the clock rate of both high-frequency sources 121, 121'. The same applies for the two receivers 123, 123', the sampling rates of which are predefined by the control unit 11.

By means of the redundant design of the high-frequency unit 12 having two high-frequency sources 121, 121' and two receivers 123, 123', it is possible for the control unit 14 to switch the first switch 120 or the second switch 124, for example, cyclically during measuring operation or during test operation of the fill-level measurement device 1. In this case, the switching of the two switches 120, 124 can take place either simultaneously or in a manner offset from one another, and, optionally, cyclically. In this case, at least one evaluation curve A(t) is recorded in each case before and after each switching, wherein the evaluation unit 14 determines from the two evaluation curves A(t) in each case a previously defined property, such as its polarity, the signal amplitude, and/or the corresponding signal transit time $t_M$ of one of the signal maxima $M_A$.

Figure 4B:
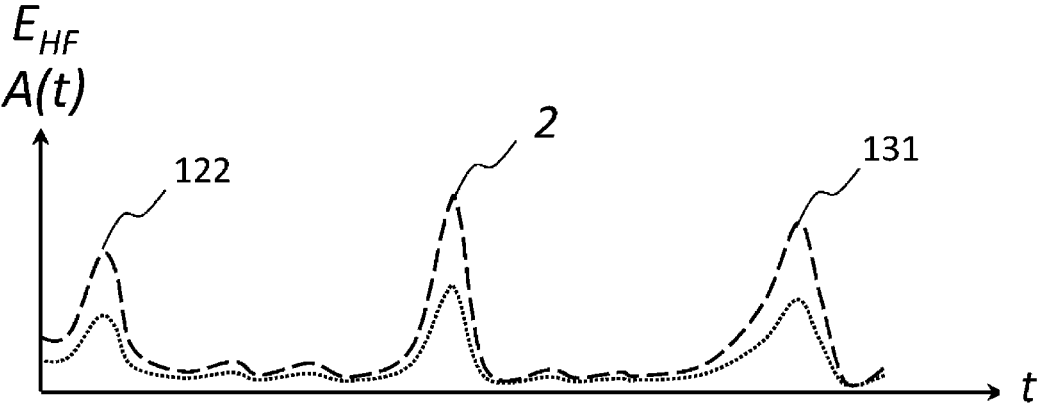

The switching, the recording of the corresponding evaluation curves A(t), and the respective determination of the defined property before and after the switching are coordinated by means of a correspondingly designed diagnosis unit 15 outside the high-frequency unit 12. In addition, the diagnosis unit 15 compares the defined property before switching with the corresponding variable after the switching. Should the property change beyond a limit value, the diagnosis unit 15 classifies the high-frequency unit 12 as non-functional, and optionally outputs a corresponding error signal. If the defined property is the signal amplitude of one of the signal maxima $M_A$, then a possible decrease in amplitude beyond the limit value, as a result of the switching, can be interpreted for example as a creeping deterioration of a high-frequency amplifier of the high-frequency unit 12, as shown in FIG. 4b.

In the embodiment of the fill-level measurement device 1 according to the invention shown in FIG. 3, the second high-frequency source 121' and the second receiver 123' are designed so as to be inverting. Since the fill-level measurement device 1 is based upon the TDR method, this offers the possibility of inverting the polarity of the received signal $E_{HF}$ or of the evaluation signal A(t), upon switching of the active receiver 123, 123', without switching the active high-frequency source 121, 121', or vice versa. This not only reduces the emissions of the fill-level measurement device 1, but it can again be used to check the functionality of the high-frequency unit 12; if the diagnosis unit 15 detects no polarity change, despite the switching of either the active high-frequency source 121, 121' or the active receiver 123, 123', the high-frequency unit 12 is to be classified as non-functional.

It goes without saying that the evaluation signal A(t), before and after switching, is in principle checked by the diagnosis unit 15 not only for one, but also for several properties, wherein the diagnosis unit 15 in this case already classifies the high-frequency unit 12 as non-functional if one of the defined properties of the evaluation signal A(t) has changed at least by a defined value as a result of the switching.

The embodiment of the fill-level measurement device 1 according to the invention shown in FIG. 3 is based upon the pulse transit time principle and, according to the TDR method, comprises a measuring probe 13 as a transmission unit. In this regard, it should be noted that the redundant design, according to the invention, of the high-frequency unit 12 having two high-frequency sources and two receivers, as well as the corresponding checking of the functionality, can in principle also be implemented in the case of freely-radiating radar or when implementing the FMCW principle.

The invention claimed is:

1. A radar-based, fill-level measurement device for measuring a fill-level of a filling material in a container, the fill-level measurement device comprising:

a transmission unit via which high-frequency signals can be sent to the filling material and, after reflection on the filling material surface, can be received as received signals, wherein the transmission unit is embodied as an electrically conductive measuring probe which, in the installed state of the fill-level measurement device, extends perpendicularly to the container base;

a high-frequency unit, including:

two activatable, high-frequency sources, each of which is designed for generating the high-frequency signal, wherein one of the two high-frequency sources is designed in an inverting manner; and two activatable receivers via which the received signal can be time-prolonged, wherein one of the two receivers is designed in an inverting manner;

a control unit embodied to activate one of the high-frequency sources such that the activated high-frequency source generates the high-frequency signal, and to activate one of the receivers such that the activated receiver converts the received signal into a time-prolonged evaluation signal;

an evaluation unit embodied to determine a defined property of the evaluation signal, including a polarity, an edge steepness, a signal amplitude, and/or a signal transit time of at least one signal maximum, and to determine the fill-level on the basis of the signal transit time of the at least one signal maximum; and a diagnosis unit embodied to: control the control unit to deactivate the high-frequency source that is active and/or the receiver that is active and to activate the high-frequency source that was previously inactive and/or the receiver that was previously inactive, so that the polarity of the received signal or of the evaluation signal is inverted; control the evaluation unit such that the defined property of the evaluation signal is determined before and after the switching; and classify the high-frequency unit as non-functional if the defined property of the evaluation signal changes at least by a defined value as a result of the switching, wherein the evaluation unit is further embodied to: invert the polarity of the evaluation signal if the polarity changes as a result of the switching; and determine the defined property on the basis of the polarity-inverted evaluation signal, and wherein the diagnosis unit is further embodied to: control the evaluation unit such that, in each case before and after the switching of the active high-frequency source or of the active receiver, its polarity is determined as the defined property of the evaluation signal; and classify the high-frequency unit as non-functional if the polarity of the evaluation signal does not change as a result of the switching.

2. The fill-level measurement device according to claim 1, wherein the diagnosis unit is designed to compare, as the defined property of the evaluation signal, the polarity, the edge steepness, the signal amplitude, and/or the corresponding signal transit time of the at least one signal maximum determined before the switching with the corresponding defined property determined after the switching.

3. The fill-level measurement device according to claim 1, wherein the receivers are designed as samplers, and wherein the control unit is further embodied to actuate the high-frequency source that is active such that the high-frequency signal is generated in a pulsed manner, and actuate the sampler that is active such that the received signal is subsampled, in accordance with the pulse transit time method, such that the evaluation signal is time-discretized.

4. The fill-level measurement device according to claim 3, wherein the diagnosis unit is further embodied to generate an error signal if the diagnosis unit classifies the high-frequency unit as non-functional.

5. A method for checking a functionality of a fill-level measurement device, the method comprising:

providing the fill-level measurement device, including:

a transmission unit via which high-frequency signals can be sent to the filling material and, after reflection on the filling material surface, can be received as received signals, wherein the transmission unit is embodied as an electrically conductive measuring probe which, in the installed state of the fill-level measurement device, extends perpendicularly to the container base;

a high-frequency unit, including:

two activatable, high-frequency sources, each of which is designed for generating the high-frequency signal, wherein one of the two high-frequency sources is designed in an inverting manner; and two activatable receivers via which the received signal can be time-prolonged in each case, wherein one of the two receivers is designed in an inverting manner;

a control unit embodied to activate one of the high-frequency sources such that the activated high-frequency source generates the high-frequency signal, and to activate one of the receivers such that the activated receiver converts the received signal into a time-prolonged evaluation signal;

an evaluation unit embodied to determine a defined property of the evaluation signal, including a polarity, an edge steepness, a signal amplitude, and/or a signal transit time of at least one signal maximum, and to determine the fill-level on the basis of the signal transit time of the at least one signal maximum; and a diagnosis unit embodied to: control the control unit to deactivate the high-frequency source that is active and/or the receiver that is active and to activate the high-frequency source that was previously inactive and/or the receiver that was previously inactive, so that the polarity of the received signal or of the evaluation signal is inverted; control the evaluation unit such that the defined property of the evaluation signal is determined before and after the switching; and classify the high-frequency unit as non-functional if the defined property of the evaluation signal changes at least by a defined value as a result of the switching, wherein the evaluation unit is further embodied to: invert the polarity of the evaluation signal if the polarity changes as a result of the switching; and determine the defined property on the basis of the polarity-inverted evaluation signal, and wherein the diagnosis unit is further embodied to control the evaluation unit such that, in each case before and after the switching of the active high-frequency source or of the active receiver, its polarity is determined as the defined property of the evaluation signal and to classify the high-frequency unit as non-functional if the polarity of the evaluation signal does not change as a result of the switching;

generating the high-frequency signal via the high-frequency source that is switched to be active;

sending the high-frequency signal to the filling material and receiving the corresponding received signal after reflection an the filling material surface;

receiving the received signal via the receiver that is switched to be active such that a time-prolonged evaluation signal is generated;

determining at least one signal maximum of the evaluation signal;

determining at least one defined property of the at least one signal maximum;

switching the high-frequency source that is active so as to be passive, and vice versa, and/or switching the receiver that is active so as to be passive, and vice versa, and subsequently repeating the prior method steps;

comparing the defined property before and after the switching; and classifying the high-frequency unit as non-functional when the defined property of the evaluation signal has changed at least by a defined value as a result of the switching.

6. The method according to claim 5, wherein the switching of the high-frequency source that is active or the receiver that is active, the comparison of the defined property before and after the switching, and the classification of the high-frequency unit with regard to its functionality are carried out cyclically.

* * * * *